United States Patent
Brück

(10) Patent No.: US 6,446,431 B1
(45) Date of Patent: Sep. 10, 2002

(54) CONFIGURATION FOR CONVERTING AT LEAST ONE EXHAUST EMISSION COMPONENT OF AN EXHAUST EMISSION FLOW FROM AN INTERNAL COMBUSTION ENGINE AND METHOD FOR OPERATING THE CONFIGURATION

(75) Inventor: Rolf Brück, Bergisch Gladbach (DE)

(73) Assignee: Emitec Gesellschaft für Emissionstechnologie mbH, Lohmar (DE)

( * ) Notice: Subject to any disclaimer, the term of this patent is extended or adjusted under 35 U.S.C. 154(b) by 0 days.

(21) Appl. No.: 09/637,590

(22) Filed: Aug. 14, 2000

Related U.S. Application Data

(63) Continuation of application No. PCT/EP99/00820, filed on Feb. 8, 1999.

(51) Int. Cl.[7] ................................................ F01N 3/00
(52) U.S. Cl. ............................ 60/289; 60/293; 60/297; 60/300; 60/303; 422/169; 422/170
(58) Field of Search ...................... 60/274, 284, 287, 60/288, 289, 297, 299, 300, 303, 292, 293; 422/169, 170, 174, 177

(56) References Cited

U.S. PATENT DOCUMENTS

| | | | | |
|---|---|---|---|---|
| 5,315,824 A | * | 5/1994 | Takeshima | 60/297 |
| 5,538,697 A | * | 7/1996 | Abe et al. | 422/171 |
| 5,634,331 A | * | 6/1997 | Aoki et al. | 60/284 |
| 5,884,473 A | * | 3/1999 | Noda et al. | 60/274 |
| 5,937,637 A | * | 8/1999 | Fujishita et al. | 60/274 |
| 6,112,520 A | * | 9/2000 | Kaiho et al. | 60/303 |
| 6,122,910 A | * | 9/2000 | Hoshi et al. | 60/297 |

\* cited by examiner

*Primary Examiner*—Thomas Denion
*Assistant Examiner*—Binh Tran
(74) *Attorney, Agent, or Firm*—Laurence A. Greenberg; Werner H. Stemer; Ralph E. Locher

(57) ABSTRACT

A system for converting at least one exhaust-gas component of an exhaust-gas stream of an internal combustion engine is disclosed. The system contains a first device that has a catalytic action and a second device that is positioned downstream of the first device in a direction of flow of the exhaust-gas stream. The second device has at least one electrically heatable first honeycomb body and a second honeycomb body that has at least one coating which at least partly absorbs hydrocarbons, and a third electrically heatable honeycomb body. Three honeycomb bodies are disposed behind each other in the direction of flow of the exhaust-gas stream.

31 Claims, 1 Drawing Sheet

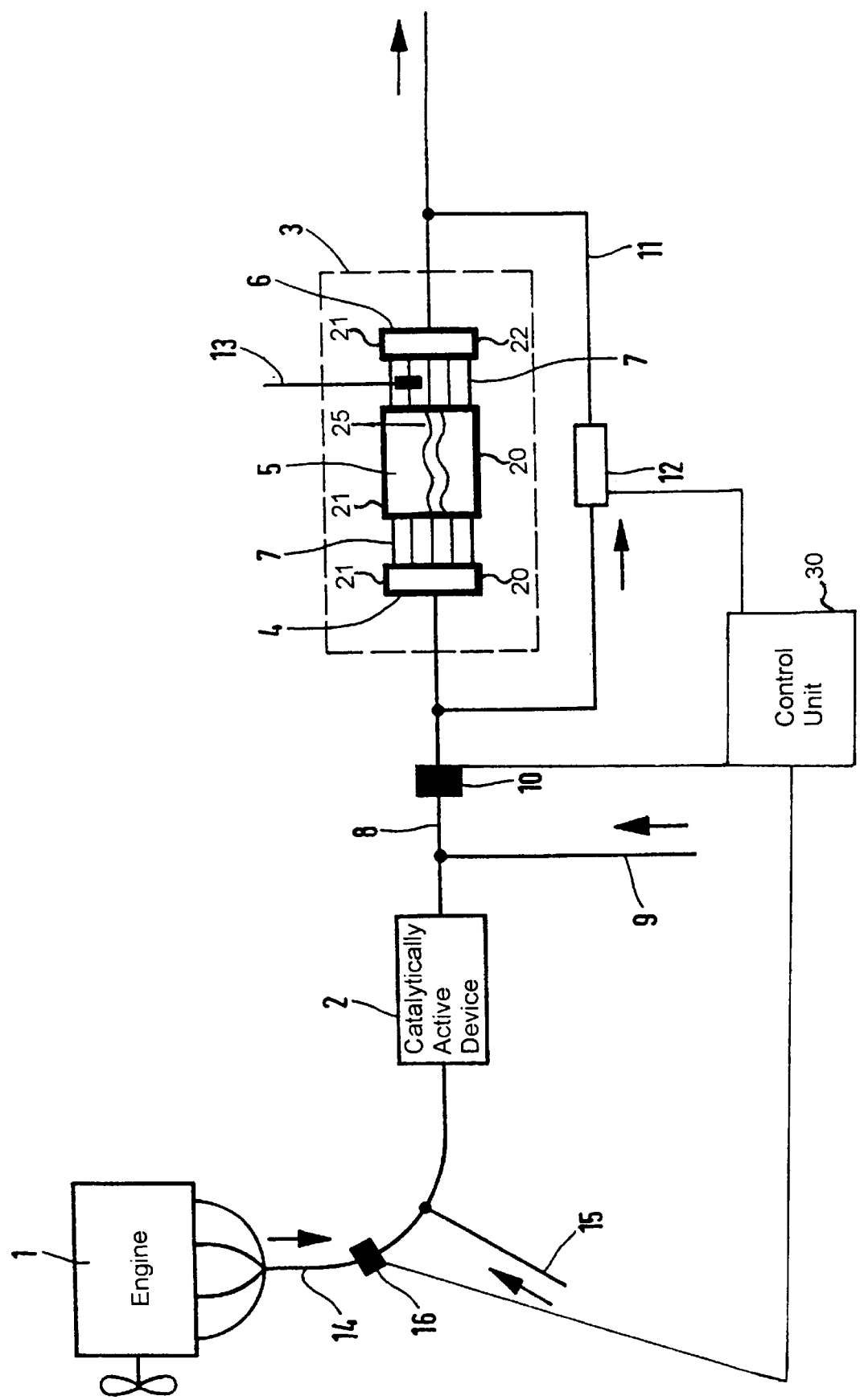

CONFIGURATION FOR CONVERTING AT LEAST ONE EXHAUST EMISSION COMPONENT OF AN EXHAUST EMISSION FLOW FROM AN INTERNAL COMBUSTION ENGINE AND METHOD FOR OPERATING THE CONFIGURATION

CROSS-REFERENCE TO RELATED APPLICATION

This is a continuation of copending International Application PCT/EP99/00820, filed Feb. 8, 1999, which designated the United States.

BACKGROUND OF THE INVENTION

Field of the Invention

The present invention relates to a configuration for converting at least one exhaust emission component of an exhaust emission flow from an internal combustion engine and to a method for the operation of such a configuration.

Various concepts have been developed in order to reduce the environmental pollution from exhaust emissions of internal combustion engines, especially from internal combustion engines used in motor vehicles. These concepts are also aimed at meeting ever lower limits for pollutant emissions.

A problem in the conversion of at least one exhaust emission component of an exhaust emission flow is the period in which the elements of the exhaust emission control system have not yet reached their operating temperature. This is essentially the case during the so-called cold-start phase of the internal combustion engine. During the cold-start phase in internal combustion engines the exhaust emission contains increased quantities of hydrocarbons, since an internal combustion engine usually runs with an excess supply of fuel in the cold-start phase. In addition to unburned hydrocarbons the exhaust emission also contains carbon monoxide. The object during the cold-start phase is to ensure oxidation of the unburned hydrocarbons and the carbon monoxide.

Following the transition from the cold-start phase to a load range of the internal combustion engine the exhaust emissions are both oxidized and reduced, as is the case, for example, with the nitrogen oxides ($No_x$).

The use of a catalytically active device for the load range, generally referred to as a three-way catalytic converter, is already known. Although the three-way catalytic converter functions excellently in the load range of the internal combustion engine, it cannot convert the unburned hydrocarbons and the carbon monoxide occurring during the cold-start phase sufficiently, so that increased emissions of hydrocarbons and carbon monoxide occur during the cold-start phase. Published, European Patent Application EP 0 485 179 A, for example, discloses an exhaust emission control system containing numerous elements, which might include, for example, a three-way catalytic converter, a hydrocarbon adsorber and a heatable honeycomb element. The configuration of individual elements may vary.

International Patent Disclosure WO 94/17290 further discloses an electrically heated catalytic converter, which at least in some partial areas has a catalytically active coating. The converter, viewed in the direction of flow, has successive electrically heatable areas. The International Patent Disclosure WO 94/17290 is based on the assumption that significant catalytic conversion of the exhaust emission only takes place at temperatures in the order of 300 to 450° C. Both Published, Non-Prosecuted German Patent Application DE 23 33 092 A1 and U.S. Pat. No. 5,417,062 further disclose the configuration of an electrically heatable honeycomb element between two catalytically active honeycomb elements, the intention being to achieve more rapid heating of the catalytically active elements.

Proceeding from this state of the art, the object of the present invention is to specify a configuration for converting at least one exhaust emission component of an exhaust emission flow from an internal combustion engine, by which a reduction in the level of pollutant components, especially of hydrocarbons, is achieved during a cold-start phase. A further object of the invention is to specify a method for the operation of the configuration, by which the configuration achieves a high efficiency.

SUMMARY OF THE INVENTION

It is accordingly an object of the invention to provide a configuration for converting at least one exhaust emission component of an exhaust emission flow from an internal combustion engine and a method of operating the configuration that overcome the disadvantages of the prior art devices and methods of this general type.

With the foregoing and other objects in view there is provided, in accordance with the invention, a configuration for converting at least one exhaust emission component of an exhaust emission from an internal combustion engine. The configuration contains a catalytically active first device and a second device disposed downstream of the first device in a direction of a flow of the exhaust emission. The second device includes at least one electrically heatable first honeycomb element, a second honeycomb element having at least one coating being hydrocarbon-adsorbent and disposed downstream of the first honeycomb element, and a electrically heatable third honeycomb element disposed downstream of the second honeycomb element in the direction of the flow of the exhaust emission. A pipe section connecting the first device to the second device is provided, and at least one secondary air line opens into the pipe section.

The first catalytically active device is, for example, a three-way catalytic converter, which forms a so-called main catalytic converter. The main catalytic converter or the first catalytically active device essentially serves for the catalytic conversion of the exhaust emission component of the exhaust emission from the internal combustion engine when the internal combustion engine is in the load range. During the cold-start phase the first catalytically active device makes only a very small, if any, contribution to the conversion of the exhaust emission component of the exhaust emission flow, since the first device has not yet reached the temperature necessary for the catalytic conversion of the exhaust emission component.

The second device, which follows the first device, has at least one electrically heatable first honeycomb element, a second honeycomb element, which has at least one coating that is at least partially at least hydrocarbon-adsorbent, and a third, electrically heatable honeycomb element disposed successively in the direction of flow of the exhaust emission.

By this configuration of the honeycomb elements with their differing functions a reduction in the emission of pollutants, especially of hydrocarbons, is achieved during the cold-start phase.

Owing to the fact that the second honeycomb element has a hydrocarbon-adsorbent coating, the hydrocarbons contained in the exhaust emission are at least partially adsorbed, thereby reducing the emission of hydrocarbons. Disposing a third, electrically heatable honeycomb element downstream of the hydrocarbon-adsorbent honeycomb element ensures that the hydrocarbons not adsorbed by the second honeycomb element and/or the already desorbed hydrocarbons are completely burned. This complete combustion is achieved, in particular, if on the third honeycomb element only the desorbed hydrocarbons pass to the third honeycomb element. This is the case, since the desorption of hydrocarbons is a relatively slow process and the third, electrically heatable honeycomb element reaches its operating temperature very rapidly.

Because a first, electrically heatable honeycomb element is disposed upstream of the second honeycomb element having the hydrocarbon-adsorbent coating, this ensures that the second honeycomb element is heated up relatively quickly. Given a very rapid temperature increase in the second honeycomb element, the hydrocarbon resorption rate is then the defining variable for the catalytic conversion of the unburned hydrocarbons, since desorption is a slower process than the catalytic conversion of the hydrocarbons.

In order to achieve the lowest possible emission of hydrocarbons during the cold-start phase it is also proposed that the first honeycomb element have a coating that adsorbs hydrocarbons. Greater hydrocarbon adsorption is thereby achieved.

According to a further advantageous development of the configuration it is proposed that the first honeycomb element have a catalytically active coating that promotes oxidation. In view of the fact that the first honeycomb element is electrically heatable and the operating temperature is attained relatively quickly, a reduction of carbon monoxide is also achieved by the catalytically active coating.

According to this advantageous development of the configuration it is also proposed that the second honeycomb element have a catalytically active coating that promotes oxidation.

In view of the fact that the third honeycomb element reaches its operating temperature relatively quickly, i.e. the temperature at which a catalytic conversion of the exhaust emission component of the exhaust emission occurs, it is proposed that the third honeycomb element have a catalytically active coating that promotes oxidation and optionally also reduction.

In order to achieve a temperature increase of at least the second honeycomb element having the hydrocarbon-adsorbent coating as quickly as possible, it is proposed that the honeycomb element have a low heat storage capacity. This ensures that only a small exchange of heat takes place between the exhaust emission and the honeycomb element. Therefore, the exhaust emission experiences only slight cooling, if any, as a result of which only a small supply of heat through the two heatable honeycomb elements is needed in order to achieve a reduction of the pollutant emission. The low heat storage capacity is preferably achieved in that the honeycomb element is formed from a sheet metal having a thickness of 15 to 65 $\mu$m, preferably of 30 $\mu$m.

In order to facilitate assembly of the configuration it is proposed that the second device form a modular unit.

It is proposed, in particular, that the first honeycomb element and/or the third honeycomb element be connected to the second honeycomb element by suitable, electrically insulating fasteners, so that the element(s) is/are fastened by the second honeycomb element. Such fasteners are disclosed, for example, in Published, Non-Prosecuted German Patent Application DE 44 34 673.5 A1.

In order to achieve oxidation of the exhaust emission component, especially oxidation of unburned hydrocarbons, it is proposed according to a further advantageous development of the invention that at least one secondary air line open into a pipe section connecting the first device and the second device. Secondary air can be introduced into the exhaust emission flow through the secondary air line, so that sufficient oxygen is present for oxidation of the hydrocarbons.

In order to provide sufficient oxygen or air for conversion of the unburned hydrocarbons, it is proposed that an oxygen sensor be disposed between the secondary air line and the second device.

Such an oxygen sensor is also referred to as a $\lambda$-probe (lambda probe). This can determine the oxygen content of the exhaust emission flow entering the second device.

It is correspondingly proposed that the oxygen sensor be connected to a control unit, by which a volumetric flow of the secondary air, fed into the exhaust emission by way of the secondary air line, can be controlled.

Should the internal combustion engine be operated at full load immediately following an idling phase, there is a risk that the catalytic reaction in the area of the second honeycomb element will be interrupted by the large volumetric flow of the exhaust emission, since the exhaust emission flow cools in and downstream of the first device, so that the temperature in the second device falls below the temperature necessary for the catalytic reaction. In order to prevent this it is proposed to lead only part of the exhaust emission flow by way of the second device. In specific terms it is proposed that a bypass line be provided, through which at least a part of the exhaust emission can be led past the second device. Devices for varying the flow cross section of the bypass line are disposed in the bypass line, thereby achieving a specific variation of the volumetric flow in the second device.

The electrically heatable honeycomb elements constitute energy consumers. In order to minimize the energy consumption of the electrically heatable honeycomb elements it is proposed that a temperature measuring device be provided, which measures the temperature of the exhaust emission flow downstream of the second honeycomb element, preferably between the second honeycomb element and the third honeycomb element. It can be determined, as a function of the measured temperature, when the hydrocarbons in the second honeycomb element are desorbed, and the electrical heating of the first and/or the second honeycomb element can thereby be switched off.

In order to further improve the conversion of the exhaust emission component of the exhaust emission it is proposed that at least one secondary air line, through which secondary air can be fed into the exhaust emission flow, open into an exhaust pipe connecting the first device to the internal combustion engine.

In order to determine the volumetric flow of the secondary air it is proposed that an oxygen sensor be disposed in the exhaust pipe upstream of the secondary air line.

The oxygen sensor is preferably connected to a control unit, which controls a mixture formation of the internal combustion engine.

Coatings, especially hydrocarbon adsorbers, may be damaged by high temperatures. Owing to the fact that the functionality of the configuration according to the invention essentially does not vary as a function of the temperature of the exhaust emission, the second device can be disposed relatively remote from the internal combustion engine. This reduces the risk of any damage to the coatings. Therefore, it is proposed in particular that the second device be disposed so remote from an internal combustion engine, viewed in the direction of flow of the exhaust emission, that the temperature inside the second device is less than 700° C. in essentially all operating conditions of the internal combustion engine.

According to a further idea of the invention, a method is proposed for converting the exhaust emission component from the internal combustion engine, in which electrical heating of the first and the third honeycomb element occurs, at the latest, on starting of the internal combustion engine. This ensures rapid heating of the two honeycomb elements, especially of the last honeycomb element in the direction of flow of the exhaust emission, thereby also reducing the pollutant emission.

In particular it is proposed that an actual temperature of the exhaust emission flow be determined downstream of the second honeycomb element, preferably between the second honeycomb element and the third honeycomb element, and that the electrical heating of the first and/or third honeycomb element be switched off as a function of a comparison between the actual temperature and a set temperature. The actual temperature downstream of the second honeycomb element in particular provides information on whether all hydrocarbons are desorbed at the second honeycomb element and have been subjected to an exothermic conversion.

According to a further advantageous development of the method it is proposed that the actual temperature of the exhaust emission flow be determined downstream of the second honeycomb element, preferably between the second honeycomb element and the third honeycomb element, and that a volumetric flow of the secondary air to be fed to the second device in dependence on a comparison between the actual temperature and a set temperature. This ensures that there is sufficient oxygen available, which is needed for the conversion of at least one exhaust emission component, especially the hydrocarbons.

As an alternative or in addition to the temperature measurement a stoicheiometric ratio of the exhaust emission is preferably determined essentially at an inlet to the second device. A volumetric flow of the secondary air is fed to the second device as a function of a comparison between the stoicheiometric ratio determined and a default stoicheiometric ratio. It is proposed, in order to determine the stoicheiometric ratio, that this be done on the basis of a measurement by an oxygen sensor.

As already stated, there is a risk that in the transition from an idling phase of the internal combustion engine to a full load range, the catalytic reaction will be interrupted by the large exhaust emission volumetric flow in the second device. In order to prevent this it is proposed that only a part of an exhaust emission be fed to the second device as a function of a speed of the internal combustion engine. The other part is led past the second device by way of a bypass line.

Other features which are considered as characteristic for the invention are set forth in the appended claims.

Although the invention is illustrated and described herein as embodied in a configuration for converting at least one exhaust emission component of an exhaust emission flow from an internal combustion engine and a method of operating the configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE of the drawing is a block diagram of a configuration connected to an internal combustion engine according to the invention.

DESCRIPTION OF THE PREFERRED EMBODIMENTS

Referring now to the single FIGURE of the drawing in detail, there is shown an internal combustion engine 1 that is connected to an exhaust pipe 14. A first catalytically active device 2 is disposed inside the exhaust pipe 14. The first catalytically active device 2 is preferably a three-way catalytic converter, which can undertake a complete exhaust emission control after a cold-start phase. The three-way catalytic converter of the first device 2 may be a monolithic honeycomb element, especially a metal honeycomb element, which is provided with a suitable catalytically active coating.

The first device 2 is followed in a direction of flow of the exhaust emission by a second device 3 for converting at least one exhaust emission component of an exhaust emission from the internal combustion engine 1.

The second device 3 has at least the below listed successive elements, viewed in the direction of flow of the exhaust emission. A first, electrically heatable honeycomb element 4, a second honeycomb element 5, which has at least one coating that at least partially adsorbs hydrocarbons, and a third, electrically heatable honeycomb element 6.

The first honeycomb element 4 preferably has a coating 20, which is at least partially hydrocarbon-adsorbent. The first honeycomb element 4 may optionally have at least one catalytically active coating 21 that promotes oxidation.

In addition to the hydrocarbon-adsorbent coating 20, the second honeycomb element 5 preferably also has the catalytically active coating 21 that promotes oxidation.

The third honeycomb element 6 preferably has one at least catalytically active coating 21 that promotes oxidation. In addition the honeycomb element may also have a coating that promotes reduction 22.

The first, second and third honeycomb elements 4, 5, 6 preferably form a modular unit. Fasteners 7, which are suitable for connecting the first honeycomb element 4 and/or the third honeycomb element 6 to the second honeycomb element 5, so that the first honeycomb element 4 and the third honeycomb element 6 are fastened to the second honeycomb element 5, are shown diagrammatically. The fasteners 7 are, in particular, electrically insulating devices, so that there is no electrical connection between the individual honeycomb elements 4, 5, 6.

The second honeycomb element 5 is formed from at least one, partially structure metal sheet 25, shown only diagrammatically. The structured sheet 25 has a thickness of between 15 and 65 μm.

A secondary air line 9 opens into a pipe section 8 connecting the first device 2 and the second device 3 together. Secondary air can be fed through the secondary air line 9 into the exhaust emission flow that passes by way of the exhaust pipe 14 and the pipe section 8 into the second device 3. An oxygen sensor 10 is disposed between the first device 2 and the second device 3. In the exemplary embodiment shown the oxygen sensor 10 is disposed downstream of a mouth of the secondary air line 9, viewed in the direction of flow of the exhaust emission.

The oxygen sensor 10 may be connected to a control unit 30 capable of controlling a volumetric flow of the air fed into the exhaust emission.

The exemplary embodiment shown in the drawing also shows the provision of a bypass line 11, through which at least a part of the exhaust emission can be led past the second device 3.

The bypass line 11 is disposed between the first device 2 and the second device 3. A device capable of adjusting the flow cross section of the bypass line 11 is denoted by the reference numeral 12. The device 12 may take the form of a throttle valve 12 or a control valve 12, for example. The device 12 is preferably connected to the control unit 30, which actuates the device 12 so that it adjusts the flow cross section of the bypass line 11 in such a way that only predetermined volumetric flows are led past the second device 3.

The first honeycomb element 4 and the third honeycomb element 6 are electrically heatable. In order to ensure that the electrical heating of the first and/or third honeycomb element 4, 6 is switched off under certain operating conditions, the second device 3 has a temperature measuring device 13. The temperature measuring device 13 is preferably disposed between the second honeycomb element 5 and the third honeycomb element 6. The temperature measuring device 13 can determine an actual temperature of the exhaust emission flow downstream of the second honeycomb element 5. The electrical heating of the first and/or third honeycomb element 4, 6 can be switched off as a function of the result of a comparison between the actual temperature and a set temperature. For this purpose the electrical heating and the temperature measuring device 13 are electrically connected to a corresponding device.

In the exemplary embodiment shown a secondary air line 15 is provided, which opens out upstream of the first device 2. An oxygen sensor 16 is also provided, which is disposed upstream of the first device 2. The oxygen sensor 16 serves essentially for adjusting the mixture for the internal combustion engine 1.

I claim:

1. A configuration for converting at least one exhaust emission component of an exhaust emission from an internal combustion engine, comprising:
   a catalytically active first device;
   a second device disposed downstream of said first device in a direction of a flow of the exhaust emission, said second device including at least one electrically heatable first honeycomb element, a second honeycomb element having at least one coating being hydrocarbon-adsorbent and disposed downstream of said first honeycomb element, and a electrically heatable third honeycomb element disposed downstream of said second honeycomb element in the direction of the flow of the exhaust emission;
   a pipe section connecting said first device to said second device; and
   at least one secondary air line opening into said pipe section.

2. The configuration according to claim 1, wherein said first honeycomb element has a hydrocarbon-adsorbent coating.

3. The configuration according to claim 1, wherein said first honeycomb element has a catalytically active coating for promoting oxidation.

4. The configuration according to claim 1, wherein said second honeycomb element has a catalytically active coating for promoting oxidation.

5. The configuration according to claim 1, wherein said third honeycomb element has a catalytically active coating for promoting oxidation.

6. The configuration according to claim 1, wherein said third honeycomb element has a catalytically active coating for promoting oxidation and also reduction.

7. The configuration according to claim 1, wherein said second honeycomb element has a low heat storage capacity so that the exhaust emission experiences only slight cooling, if any, due to an exchange of heat with said second honeycomb element.

8. The configuration according to claim 7, wherein said second honeycomb element is formed from at least one partially structured metal sheet.

9. The configuration according to claim 8, wherein said partially structured metal sheet has a thickness of 15 to 65 $\mu$m.

10. The configuration according to claim 8, wherein said partially structured metal sheet has a thickness of 30 $\mu$m.

11. The configuration according to claim 1, wherein said second device is a modular unit.

12. The configuration according to claim 11, including electrically insulating fasteners connecting said first honeycomb element to said second honeycomb element so that said first honeycomb element is fastened to said second honeycomb element.

13. The configuration according to claim 11, including electrically insulating fasteners connecting said third honeycomb element to said second honeycomb element so that said third honeycomb element is fastened to said second honeycomb element.

14. The configuration according to claim 11, including electrically insulating fasteners connecting said first honeycomb element and said third honeycomb element to said second honeycomb element so that said first honeycomb element and said third honeycomb element are fastened to said second honeycomb element.

15. The configuration according to claim 1, including an oxygen sensor disposed between said first device and said second device.

16. The configuration according to claim 15, wherein said oxygen sensor is connected to a control unit controlling a volumetric flow of a secondary air fed into the exhaust emission by way of said secondary air line.

17. The configuration according to claim 1, including a bypass line through which at least a part of the flow the exhaust emission is to be led past said second device and connected to said pipe section, said bypass line having a device for adjusting a flow cross section of said bypass line.

18. The configuration according to claim 1, including a temperature measuring device disposed between said second honeycomb element and said third honeycomb element for measuring a temperature of the exhaust emission measured downstream of said second honeycomb element.

19. The configuration according to claim 1, including:
   an exhaust pipe connected to said first device and to be connected to the internal combustion engine; and
   a further secondary air line conducting secondary air into the flow of the exhaust emission and opening into said exhaust pipe.

20. The configuration according to claim 19, including an oxygen sensor disposed in said exhaust pipe upstream of said further secondary air line.

21. The configuration according to claim 20, including a control unit connected to said oxygen sensor for controlling a mixture formation of the exhaust gas from the internal combustion engine.

22. The configuration according to claim 1, wherein said second device is disposed so remote from the internal combustion engine, viewed in the direction of the flow of the exhaust emission, so that a temperature inside said second device is less than 700° C. in substantially all operating conditions of the internal combustion engine.

23. The configuration according to claim 1, including an oxygen sensor disposed between said secondary air line and said second deivice.

24. The configuration according to claim 1, including a temperature measuring device disposed downstream of said second honeycomb element for measuring a temperature of the exhaust emission.

25. A method for converting at least one exhaust emission component of an exhaust emission from an internal combustion engine, which comprises the steps of:
   providing a configuration formed of:
      a catalytically active first device;
      a second device disposed downstream of the first device in
      a direction of a flow of the exhaust emission, the second device including at least one electrically heatable first honeycomb element, a second honeycomb element having at least one coating being hydrocarbon-adsorbent and disposed downstream of the first honeycomb element, and an electrically heatable third honeycomb element disposed downstream of the second honeycomb element in the direction of the flow of the exhaust emission;
      a pipe section connecting the first device to the second device; and
      at least one secondary air line opening into the pipe section; and
   electrically heating the first honeycomb element and the third honeycomb element on starting of the internal combustion engine.

26. The method according to claim 25, which comprises:
   determining a temperature of the flow of the exhaust emission downstream of the second honeycomb element; and
   interrupting the heating of at least one of the first honeycomb element and the third honeycomb element in dependence on a comparison between the temperature and a set temperature.

27. The method according to claim 25, which comprises:
   determining a temperature of the exhaust emission downstream of the second honeycomb element; and
   feeding in a volumetric flow of secondary air to the second device in dependence on a comparison between the temperature and a set temperature.

28. The method according to claim 25, which comprises determining a stoichiometric ratio of the flow of the exhaust emission at an inlet to the second device and a volumetric flow of secondary air is fed to the second device in dependence on a comparison between the stoichiometric ratio determined and a default stoichiometric ratio.

29. The method according to claim 25, which comprises feeding only a part of the exhaust emission to the second device in dependence on a speed of the internal combustion engine.

30. The method according to claim 25, which comprises:
   determining a temperature of the flow of the exhaust emission between the second honeycomb element and the third honeycomb element; and
   interrupting the heating of at least one of the first honeycomb element and the third honeycomb element in dependence on a comparison between the temperature and a set temperature.

31. The method according to claim 25, which comprises:
   determining a temperature of the exhaust emission between the second honeycomb element and the third honeycomb element; and
   feeding in a volumetric flow of secondary air to the second device in dependence on a comparison between the temperature and a set temperature.

* * * * *

UNITED STATES PATENT AND TRADEMARK OFFICE
CERTIFICATE OF CORRECTION

PATENT NO.    : 6,446,431 B1
DATED         : September 10, 2002
INVENTOR(S)   : Rolf Brück It is certified that error appears in the above-identified patent and that said Letters Patent is hereby corrected as shown below:

<u>Title page,</u>
Item [30], should read as follows:

-- Foreign Application Priority Data

Feb. 13, 1998      (DE) …………………..198 06 033.5 --

Signed and Sealed this

Tenth Day of December, 2002

JAMES E. ROGAN
*Director of the United States Patent and Trademark Office*